United States Patent
Patel et al.

(10) Patent No.: US 12,074,924 B2
(45) Date of Patent: Aug. 27, 2024

(54) DETERMINING ALTERNATE MEETING PARTICIPANTS BASED ON PURPOSE AND ROLE DETECTION

(71) Applicant: Mitel Networks Corporation, Kanata (CA)

(72) Inventors: Ashvin Patel, Fremont, CA (US); Maura Higgins, Los Altos, CA (US)

(73) Assignee: Mitel Networks Corporation, Kanata (CA)

( * ) Notice: Subject to any disclaimer, the term of this patent is extended or adjusted under 35 U.S.C. 154(b) by 0 days.

(21) Appl. No.: 18/083,962

(22) Filed: Dec. 19, 2022

(65) Prior Publication Data

US 2024/0205273 A1    Jun. 20, 2024

(51) Int. Cl.
*H04L 12/18* (2006.01)
*G06F 16/9535* (2019.01)
*H04L 29/06* (2006.01)
*H04L 65/1093* (2022.01)
*H04L 65/403* (2022.01)

(52) U.S. Cl.
CPC ...... *H04L 65/1093* (2013.01); *G06F 16/9535* (2019.01); *H04L 65/403* (2013.01)

(58) Field of Classification Search
None
See application file for complete search history.

(56) References Cited

U.S. PATENT DOCUMENTS

| | | | | |
|---|---|---|---|---|
| 2009/0307045 A1* | 12/2009 | Chakra | ............... | G06Q 10/109 705/7.18 |
| 2013/0339077 A1* | 12/2013 | Maresh | ............... | G06Q 10/06 705/7.18 |
| 2015/0058425 A1* | 2/2015 | Nathan | ............... | H04L 65/403 709/206 |
| 2016/0117624 A1* | 4/2016 | Flores | ............... | H04L 67/306 705/7.39 |

(Continued)

OTHER PUBLICATIONS

Coms Doc, "Coms Documentation (All),"; https://conference-service.com/doc/participants/selecting_participants.html; Last updated Dec. 2022; pp. 1-162.

(Continued)

*Primary Examiner* — Natisha D Cox (57) ABSTRACT

A conferencing system operable on a computer network includes a conference server that communicates with a conference host device that provides conference information to the conference server. A participant scoring engine, which may be part of a search engine, is in communication with a participant database. The participant database includes one or more attributes of available participants. The participant scoring engine (a) filters or ranks the participants based on the conference information provided by a conference host via the conference host device to the conference server, and by comparing the conference information to the one or more attributes of at least some of the available participants creates a filtered participant database that includes a subset of the participants in the database, and (b) determines a score for each of the participants in the filtered participant data- (Continued)

base, wherein the score is based on the conference information and the one or more attributes of each participant in the filtered database.

19 Claims, 4 Drawing Sheets

(56) References Cited

U.S. PATENT DOCUMENTS

| | | | | |
|---|---|---|---|---|
| 2021/0105147 | A1* | 4/2021 | Waugh | H04L 67/535 |
| 2021/0399911 | A1* | 12/2021 | Jorasch | H04L 12/1822 |
| 2021/0399912 | A1 | 12/2021 | Stewart | |
| 2023/0066845 | A1* | 3/2023 | Nagar | G06Q 10/103 |

OTHER PUBLICATIONS

Zoom Support, "Managing Participants in a Meeting"; https://support.zoom.us/hc/en-us/articles/115005759423-Managing-participants-in-a-meeting; pp. 1-6.

CFP Land, "How Conferences Choose Their Speakers", Karl Hughes; https://www.cfpland.com/guides/speaking/how-conferences-choose/; pp. 1-7.

JotForm Blog, "How Audio Can Change Video Conferencing as We Know It", Sam O'Brien dated Apr. 20, 2022; https://www.jotform.com/blog/ai-changes-video-conferencing/; pp. 1-5.

* cited by examiner

DETERMINING ALTERNATE MEETING PARTICIPANTS BASED ON PURPOSE AND ROLE DETECTION

FIELD

This disclosure relates to systems and methods for identifying meeting participants or alternate meeting participants.

BACKGROUND

Meetings are a core part of business and many workers spend over twenty hours per week on average in meetings. Due to working from home, the average number of meetings has increased by about 70%. Many workers also spend about an hour a day creating meetings, with an average time of five to seven minutes to create each meeting.

In some cases, creating meetings can take a relatively long time because a required meeting participant is unavailable and an alternate must be identified. A typical method to identify and invite one or more alternate participants is by emailing the original participant, a group, or a group manager, and waiting for a response regarding an acceptable alternate participant.

Further, some existing scheduling systems help conference hosts find available meeting times based on participants' availability and their respective time zones. Such scheduling systems, however, typically only identify the first available time slot that can accommodate all required original participants. Also, existing meeting systems rely largely on the knowledge and persistence of the conference host (also referred to as a meeting host or user), so meeting creation can require extensive human intervention to ensure that the proper participants are available, invited to the meeting, and that the meeting date and time are appropriate.

Any discussion of problems provided in this section has been included in this disclosure solely for the purposes of providing a background for the present invention and should not be taken as an admission that any or all of the discussion was known at the time the invention was made.

SUMMARY

A conferencing system and method is disclosed, wherein the system is a computer network that includes a conference server that communicates with a conference host device, which provides conference information to the conference server. A system and method of this disclosure may select original participants for a meeting (also called a conference), or select alternate participants if an original participant declines a meeting request (also called an invitation) or fails to attend the meeting. The information may be any aspect of a meeting, such as one or more of the meeting subject (also called a topic), meeting subtopics, other meeting participants, meeting date and time, prior meetings on the same or similar topics, presentation topics for the meeting, presentation materials for the meeting, and meeting presenters.

A participant scoring engine, which may be a separate device or part of a search engine or other device, is in communication with a participant database and in communication with the conference server. The participant scoring engine could also be in communication with participant devices in addition to or instead of the conference server. The participant database includes participant names and one or more attributes of each of the participants, which may be ranked and provided by the participant scoring engine after it receives them from the participant devices or the conference server.

The participant scoring engine or the search engine accesses the participant database and (a) filters (also called ranks) the participants based on the conference information provided by the conference host to the conference server, and by comparing the conference information to the one or more attributes of at least some of the available participants, (b) based on the filtering (or ranking), creates a filtered participant database that includes a subset of the participants in the database, and (c) determines a score for each of the participants in the filtered participant database, wherein the score is based on a comparison of the conference information to the one or more attributes of each participant in the filtered database. The number of participants in the filtered database can be determined by the ranking engine, search engine, or conference server based on the number of participants the conference host desires for the meeting, based on the number of alternate participants desired by the conference host, or based on other information provided by the conference host, such as a predetermined number of participants.

The filtered participant database with scores is provided to the meeting host or a system and method of this disclosure automatically populates the meeting invitation with participants, or one or more alternate participants, based on the participant scores in the filtered database.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of this disclosure relate to electronic communication systems, and corresponding methods performed by such systems, that can, for example, improve a conference host's ability to identify participants for a meeting and populate a meeting invitation. I could also be used to improve a conference host's ability to identify a suitable meeting date and time. The system(s) (and corresponding method(s) implemented by such a system(s)) is adapted for identifying meeting participants or alternate meeting participants based on criteria such as the meeting topic, subtopics, other participants, meeting presenters, presentation materials, and/or available meeting dates and times.

The systems and methods of this disclosure can automatically: suggest original or alternative participants, automatically populate meeting invitations with original or alternative participants, provide a filtered list of original or alternative participants to the conference host, and/or identify and populate meeting invitations with a suitable date and time. Hence, a system and method of this disclosure can suggest or select meeting participants during the meeting creation step, or it can suggest or select alternate participants if an original participant declines the meeting or fails to attend.

This disclosure provides a system and method for, by analyzing the meeting information such as the meeting topic, identifying original or alternate participants. The system and method then identifies alternate participants based on comparing the participant attributes in the participant database to the meeting information. Participant attributes can include: (a) the participant's education, (b) the participant's work experience, (c) the participant's job title, (d) prior conferences in which the participant has participated, (e) prior conferences the participant has hosted, (f) articles the participant has authored, (g) prior presentations of the participant at prior conferences, (h) the conference topic, (i) prior communications to and from other participants, (j) the organization to which the participant belongs, (k) the relationship of the participant to other participants, (l) the relationship of the participant to the conference host, (m) an availability of the participant to attend the conference, (n) the participant's physical location and time zone, (o) languages spoken by the participant, (p) sex of the participant, and (q) the alma mater of the participant.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

As used herein, "tangible, non-transitory memory" refers to computer program instructions, encoded on computer storage medium for execution by, or to control the operation of, data processing apparatus. Alternatively, or additionally, the program instructions can be encoded on an artificially-generated propagated signal, e.g., a machine-generated electrical, optical, or electromagnetic signal, which is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

As used herein, "software" refers to programs or other operating information utilized by a processor or other computing hardware.

As used herein, "meeting" means a meeting or conference such as telephonic, video, audio/video, in-person, a hybrid of any of the preceding, and any type of meeting involving multiple participants.

Figure 1:
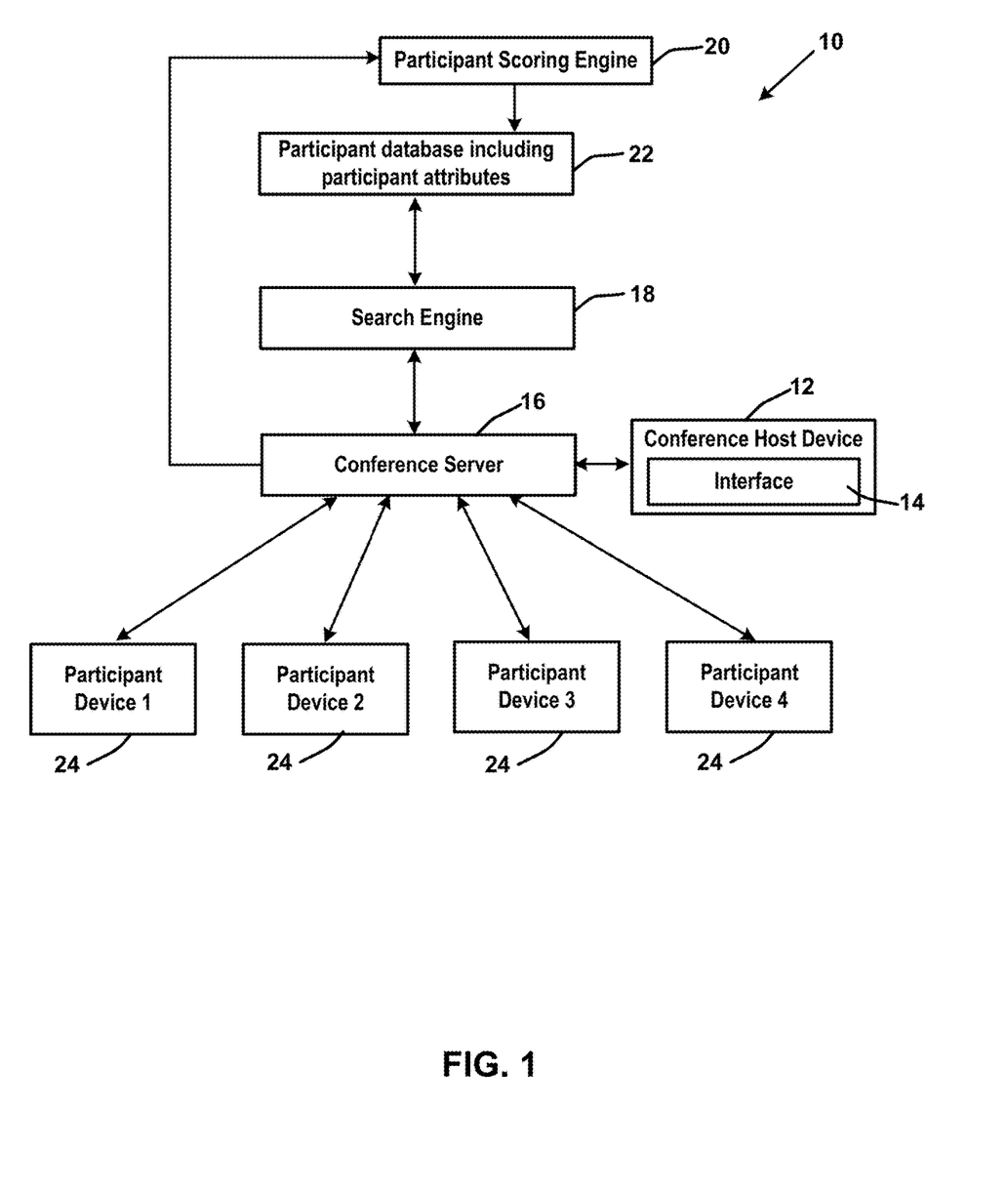
FIG. 1 is a block diagram of a system according to aspects of this disclosure.

Turning now to the Figures, wherein the purpose is to describe exemplary embodiments of this disclosure and not to limit the scope of the claims, FIG. 1 shows a system 10 according to aspects of this disclosure. System 10 includes a conference host device 12 that is operated by the conference host. Host device 12 can be any electronic device that is assigned to the conference host and that is capable of communicating with conference server 16 in the manner set forth herein, and can be a computer, smart phone, pad, or other suitable device. Conference host device 12 has an interface 14, which can be any suitable interface, such as a keyboard, touch screen, audio input, mouse, or other, for the conference host to send conference information, instructions, inquiries, comments, or other communications to conference server 16, and to receive communications from conference server 16.

Conference server 16 is any suitable computing device, such as a computer, processor, router, or server. Conference server 16 includes software to provide instructions to the hardware of conference server 16 and/or may include a tangible, non-transitory memory, which includes computer program instructions that help control the operation of conference server 16.

Conference server 16 is in communication with a search engine 18. A participant scoring engine 20 may be resident on search engine 18 or conference server 16, although scoring engine 20 could be a separate device or resident on a separate device. Search engine 18 and scoring engine 20 are each any suitable computing device, such as a computer, processor, router, or server. Search engine 18 and participant scoring engine 20 are each configured to communicate with participant database 22, and participant scoring engine 20 could be configured to independently communicate with participant database 22.

Participant database 22 may be resident on conference server 16, search engine 18, participant scoring engine 20, or an any other suitable device. Participant database 22 includes the names and attributes of available participants.

One or more participant devices 24 are in communication with conference server 16, and may instead or additionally communicate directly with participant scoring engine 20. Each participant device 24 is assigned to a unique participant and may be any suitable device, such as a computer, tablet, or cell phone. Conference server 16 is configured to send meeting invitations to participant devices 24 and participant devices 24 are configured to receive the meeting invitations. Conference server 16 may also be configured to automatically check a calendar on each of participant devices 24 to determine a participant's availability for a meeting. Each participant device 24 may also be configured to automatically send updates to the conference server 16 or to the participant scoring engine 20 regarding one or more of the participant's attributes, some of which were previously listed herein. The participant attributes are saved by participant in participant database 22.

The conference host utilizes interface 14 on conference host device 12 to schedule a meeting. The planned meeting transmitted to conference server 16 includes conference information, which is at least a meeting subject (also called a meeting topic, conference subject, or conference topic).

Conference server 16 transmits conference information provided by the conference host through conference host device 12 utilizing interface 14 to search engine 18. Search engine 18 communicates with participant database 22 and accesses the participant names and attributes. Participant scoring engine 20 may (1) organize the attributes of each participant in participant database 22, and/or (2) compare the participant attributes to the conference information provided by the conference host and ranks (or filters) the participants to identify original participants for the meeting or alternate participants for the meeting. Alternatively, search engine 18 can rank the participants by comparing participant attributes to the conference information.

The search engine 18 or participant scoring engine 20 identifies participants by (a) filtering or ranking the participants in participant database 22 based on the information provided by the conference host to the conference server 16, and by comparing the information to the one or more attributes of at least some of the participants in participant database 22, (b) based on the filtering or ranking by search engine 18 or participant scoring engine 20, or other device, creating a filtered participant database that includes a subset of the participants in the participant database 22, and (c) the search engine 18 or participant scoring engine 20 determining a score for each of the participants in the filtered participant database, wherein the score is based on a comparison of the conference information to the one or more attributes of each participant in the filtered database. The number of participants in the filtered database can be determined by the participant scoring engine (also called a ranking engine) 20, search engine 18, or conference server 16 based on the number of participants the conference host desires for the meeting, or based on the number of alternate participants desired by the meeting host, or based on other information provided to conference server 16 by the conference host.

The filtered participant database (with a score for each participant, or alternate participant) in the filtered database is provided to the meeting host, or is used to automatically populate the meeting invitation by selecting the participant(s) with the highest score(s) until the number of participants desired by the meeting host is reached. The conference server 16 may transmit conference invitations to participant devices 24 of each participant selected for the meeting.

The filtered database may include participants deemed suitable by the search engine 18 or the participant scoring engine 20 based on a predetermined-score (or ranking) criteria provided by the conference host or that had been otherwise programmed in or communicated to search engine 18 or participant scoring engine 20. The scores, participant names, and participant attributes may be provided to the conference server 16, which may transmit the scores, participant names, and participant attributes to the conference host device 12, or automatically populate the meeting invitation. The filtered database may be resident at any suitable location, such as on the participant database 22, the search engine 18, the participant scoring engine 20, the conference server 16, or any other suitable location.

Additionally, an original or alternate participant may, if declining a meeting invitation, transmit the decline to conference server 16 along with a suggested alternate participant, and conference server 16 can then transmit the decline and the suggested alternate to the conference host device 12 for the conference host to review.

Additionally, if a predetermined number of original or alternate participants decline the conference invitation, the conference server 16 or search engine 18 may be configured to (a) communicate with electronic calendars on participant devices 24 of the original participants and/or alternate participants to determine an alternate date and time for the meeting, and (b) send a new meeting invitation with the alternate date and time to selected participants.

Each of participant devices 24 may also be used by participants to enter ratings of other of the participants into the conference server 16, which causes the ratings to be stored in the participant database 22, wherein the attributes include the ratings and could include the participant who provided each rating.

Figure 2:
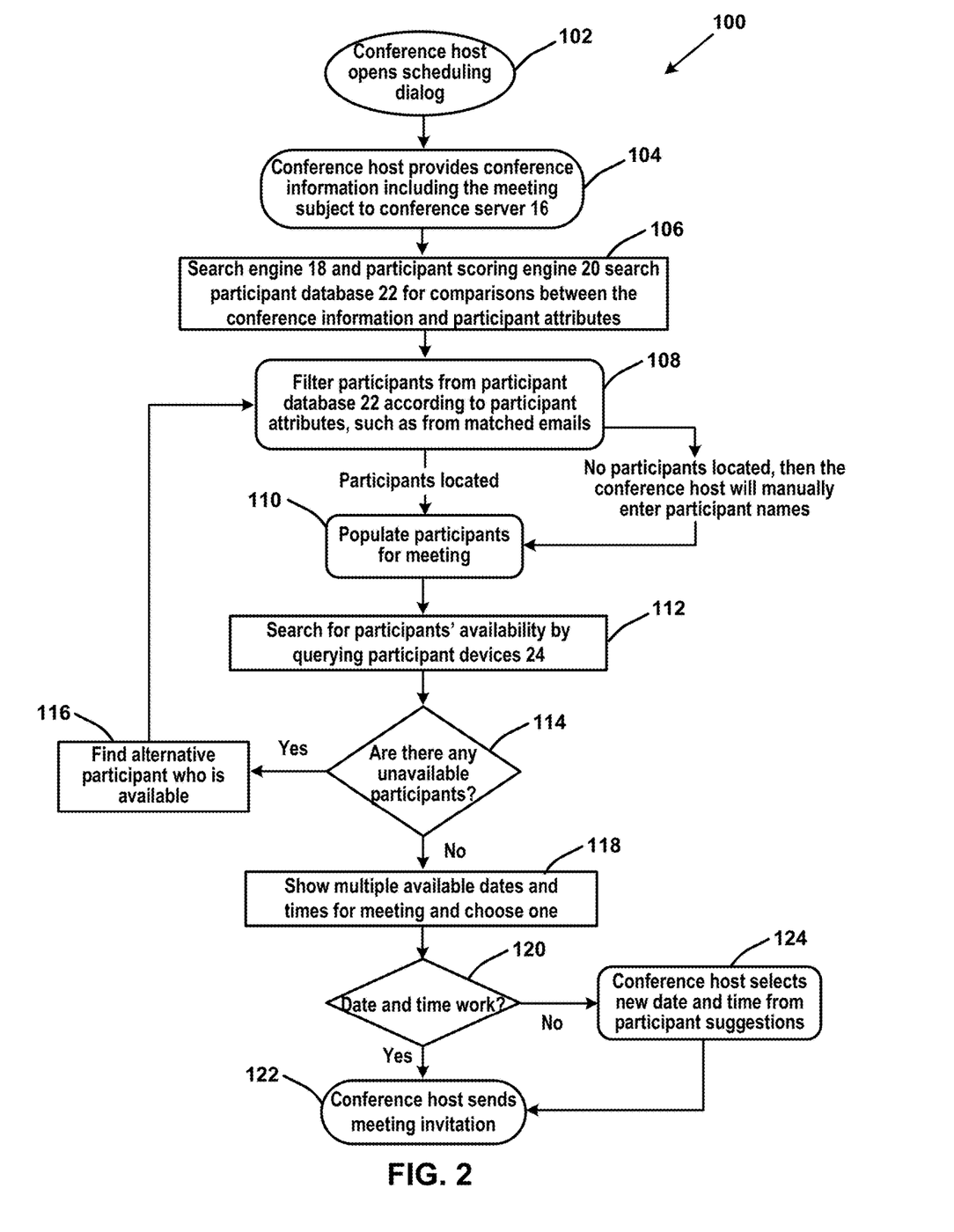
FIG. 2 is a block diagram of a method according to aspects of this disclosure.

FIG. 2 illustrates a method 100 according to aspects of this disclosure. At step 102 the conference host opens scheduling dialog using interface 14 or conference host device 12. The conference host then provides at step 104 conference information, which includes at least the meeting subject, to conference server 16.

The conference server 16 then provides the conference information to search engine 18 and/or participant scoring engine 20. At step 106 participant database 22 is searched and a comparison is made between the conference information and the participant attributes to identify suitable participants. At step 108 participants are filtered from participant database 22 to create a filtered database. In this example, the conference information is compared to prior emails or other information, such as instant messages (IM), of each participant. Scoring engine 20 creates a score and then a filtered database is created.

If no suitable participants are located the conference host will manually enter participant names into the meeting invitation. If suitable participants are identified by the system/method they are populated into the meeting invitation at step 110. Conference server 16 then checks the availability at step 112 of each suitable participant, either by querying a participant device 24 and receiving a response, or by automatically, electronically querying each relevant device 24.

If there are any unavailable participants (step 114) the system/method can find at step 116 one or more alternate participants by repeating steps 108, 110, and 112. The conference host may then choose a meeting date and time or conference server 16 may identify a date and time by inquiring participant devices 24. At step 118 multiple available dates and times are presented to the conference host, who chooses a date and time. If the date and time are suitable to the participants (step 120) the conference host send a meeting invitation at step 122. If the date and time do are not suitable, the conference host in this example, selects a new date and time based on participant suggestions and sends at step 122 a meeting invitation.

Figure 3:
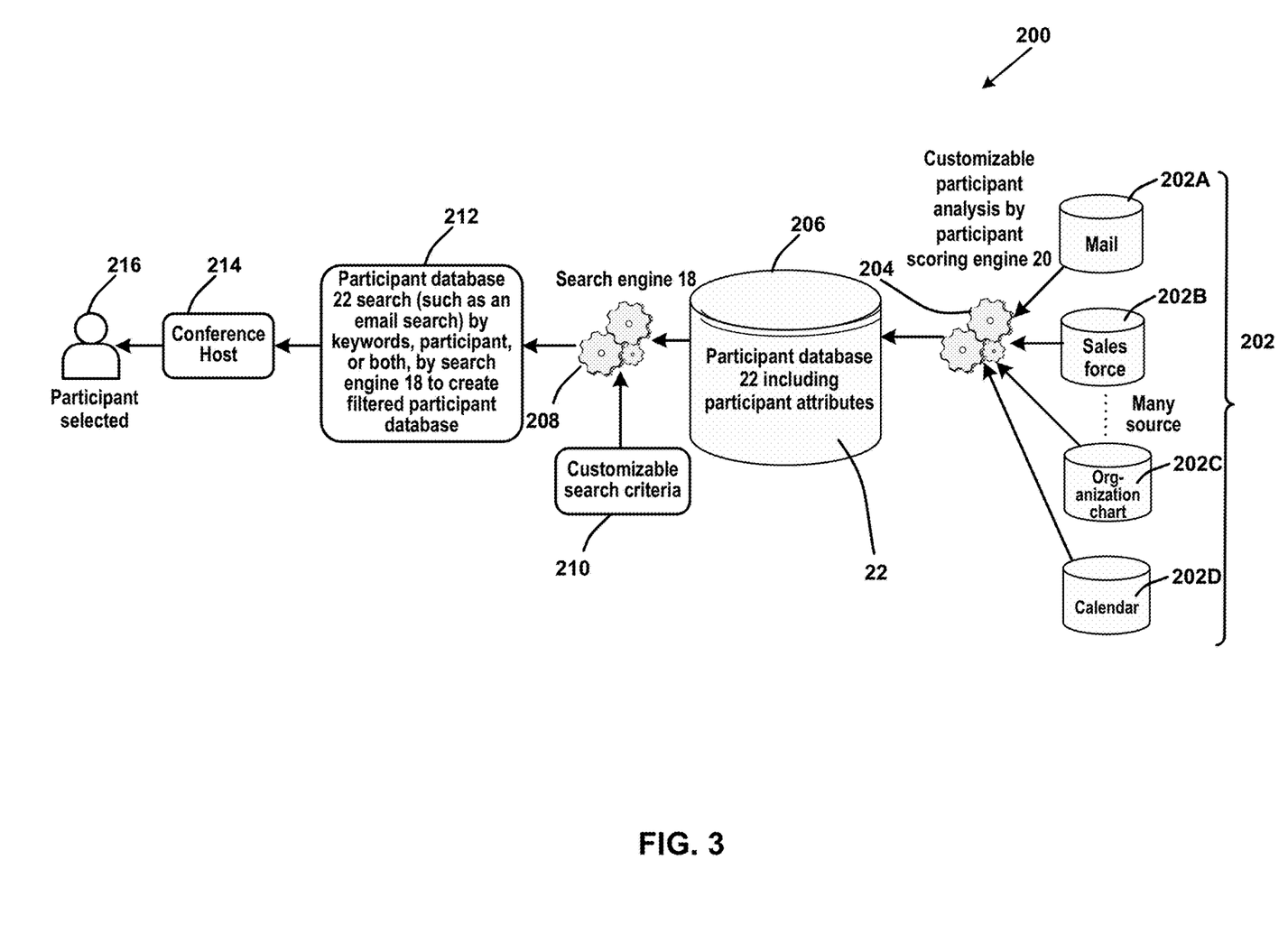
FIG. 3 is a block diagram of an alternate method according to aspects of this disclosure.

Another aspect of this disclosure is to provide application programming interfaces (APIs) using a workflow engine 208, as shown in FIG. 3. An API can be hosted on conference server 16, on conference host device 12, or on a web server, which conference host device 12 can access. Workflow engine 208 allows the API results to be customized by customer's administrator.

In FIG. 3 numerous attributes 202 of each participant are added to participant database 22. Examples of attributes 202 are emails 202A, sales force information 202B, organizational chart information 202C, and calendar 202D. These are analyzed at step 204 by participant scoring engine 20 and added at step 206 to participant database 22. At step 208 search engine 18 utilizes search criteria at step 210, wherein the search criteria is the conference information provided by the conference host plus any criteria for a score that a participant must receive to be placed on the filtered participant list, to search participant database 22.

At step 212 the participant database is searched and participants are ranked or scored by search engine 18 or participant scoring engine 20. A filtered participant database with participant scores is provided at step 214 to the conference host who selects one or more suitable original participants or alternate participants at step 216.

Figure 4:
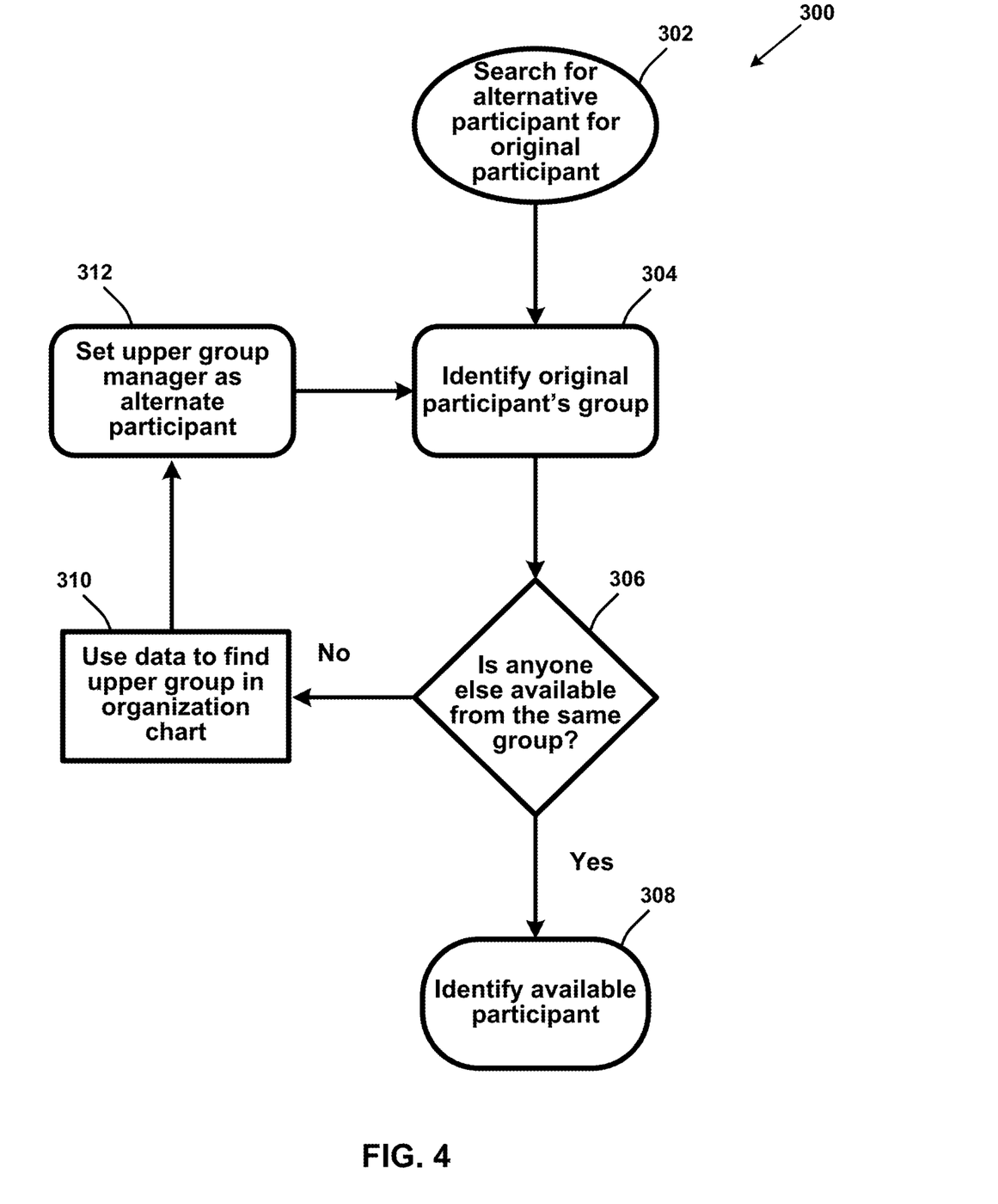
FIG. 4 is a block diagram of an alternate method according to aspects of this disclosure.

FIG. 4 shows an example of basic method steps and rules to identify suitable alternate participants for an unavailable participant based on alternate participant availability or skills.

At step 302 an alternate participant is searched for utilizing and of the previously-identified system components and method steps. In this example, at step 304 the group of the original participant is identified. At step 306 the method determines whether someone else is available from the original (and now unavailable) participant's group is available for the meeting. If so, at step 308 the available alternate participant is available. If no one is available from the original participant's group, this method identifies at step 310 an upper group, which is the group to which the original participant's group reports. At step 312 the manager of the upper group is identified as the alternate participant. Then steps 304, 306, 310, and 312 are repeated until an alternate participant is identified.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed:

1. A conferencing system operable on a computer network, wherein the conferencing system comprises:
a conference server configured to prepare and transmit a conference invitation based on information provided by a conference host, wherein the information includes a conference topic;
a conference host device associated with the conference host, wherein the conference host device is configured to communicate with the conference server and includes an interface configured to permit the conference host to transmit the information to the conference server;
a database of available participants within an organization, wherein the database includes names and attributes of each of the available participants;
a search engine in communication with the database and in communication with the conference server, wherein the search engine comprises a participant scoring engine configured to determine a score for each of the participants based on the information and the attributes of each of the participants in the participant database;
wherein the conference server is configured to query the search engine after the conference host transmits the information from the conference host device to the conference server, and the participant scoring engine (a) accesses the database and creates a filtered database that includes one or more of the available participants, and (b) determines a score for each of the participants in the filtered database;
wherein the conference server is further configured to automatically send conference invitations to participants deemed suitable by the participant scoring engine based on a predetermined-score criteria; and
if one of the participants is unable to attend a conference to which the participant has been invited, the search engine is configured to select an alternate participant from a group of the participant, and if no alternate participant is available from the group of the participant, the search engine is configured to select a second alternate participant from a group to which the participant's group reports.

2. The conferencing system of claim 1, wherein the conference server is further configured to transmit the names and attributes of each of the participants deemed suitable by the participant scoring engine based on the predetermined-score criteria to the conference host device for review by the conference host.

3. The conferencing system of claim 1, wherein the conference server sends conference invitations to one or more original participants, and the conference server is configured to query the search engine to determine the alternate participant from the group of the participant if one of the one or more original participants declines a conference invitation.

4. The conferencing system of claim 1, wherein the attributes of each of the participants is one or more of: (a) the participant's education, (b) the participant's work experience, (c) the participant's job title, (d) prior conferences in which the participant has participated, (e) prior conferences the participant has hosted, (f) articles the participant has authored, (g) prior presentations of the participant at prior conferences, (h) the conference topic, (i) prior communications to and from other participants, (j) the organization to which the participant belongs, (k) the relationship of the participant to other participants, (l) the relationship of the participant to the conference host, (m) an availability of the participant to attend the conference, (n) the participant's physical location and time zone, (o) languages spoken by the participant, (p) sex of the participant, and (q) the alma mater of the participant.

5. The conferencing system of claim 1, wherein the database is resident on either the search engine or the conference server.

6. The conferencing system of claim 1 that further comprises one or more participant devices, wherein each of the one or more participant devices is associated with a unique participant, is configured to communicate with the conference server, and automatically sends updates to the conference server regarding the unique participant's attributes.

7. A conferencing method utilizing a computer system and conferencing network, the conferencing method comprising the steps of:
- a conference host using an interface of a conference host device to provide information that includes a conference topic to a conference server;
- after receiving the information from the conference host device, the conference server communicating with and querying a search engine that comprises a participant scoring engine;
- in response to the querying, the participant scoring engine accessing a database of participants in an organization, wherein the database includes names and attributes of each of the participants;
- the participant scoring engine determining a score for each of the participants based on the conference topic and the participant's attributes;
- the conference server automatically sending conference invitations to participants deemed suitable by the participant scoring engine based on a predetermined-score criteria; and
- if one of the participants is unable to attend a conference to which the participant has been invited, the search engine selects an alternate participant from a group of the participant, and if no alternate participant is available from the group of the participant, the search engine selects a second alternate participant from a group to which the participant's group reports.

8. The conferencing method of claim 7 that further includes the step of the participant scoring engine providing the scores, participant names, and participant attributes to the conference server for each participant deemed suitable by the participant scoring engine based on a predetermined-score criteria.

9. The conferencing method of claim 7, further comprising (a) a step of each selected participant accepting or declining a conference invitation, and (b) a step of selecting an alternate participant for each selected participant that declines the invitation by utilizing the method of claim 7.

10. The conferencing method of claim 7, further comprising a step of each selected participant accepting or declining a conference invitation wherein the selected participant that declines the invitation has an assigned participant device in communication with the conference server and the conference host device.

11. The conferencing method of claim 7, wherein the conference server is further configured to contact one or more alternate participants if a participant who accepted the conference invitation fails to attend the conference.

12. The conferencing method of claim 7, wherein the host communicates the predetermined-score criteria through an interface of the conference host device to the conference server, which transmits the predetermined-score criteria to the search engine.

13. The conferencing method of claim 7, wherein if a predetermined number of selected participants declines the conference invitation, the conference server or the search engine is further configured to (a) communicate with electronic calendars of the selected participants to determine an alternate date and time for the conference, and (b) send a new conference invitation with the alternate date and time to the selected participants.

14. A conferencing system operable on a computer network, wherein the conferencing system comprises:
- a conference server configured to communicate with a conference host device and a plurality of participant devices, wherein the conference host device is configured to provide conference information, including a conference topic, provided by a conference host, to the conference server;
- a database of participants in an organization, wherein the database includes names and attributes of each of the participants;
- a participant scoring engine in communication with the database and the conference server, wherein the participant scoring system is configured to (a) filter the participants based on the conference topic and one or more of the attributes to create a filtered participant database that includes a subset of the participants in the database, and (b) determine a score for each of the participants in the filtered database, wherein the score is based on the conference topic and the attributes of each participant;
- the conference server being further configured to automatically send conference invitations to participants deemed suitable by the participant scoring engine based on a predetermined score criteria; and
- if one of the participants is unable to attend a conference to which the participant has been invited, the search engine is configured to select an alternate participant from a group of the participant, and if no alternate participant is available from the group of the participant, the search engine is configured to select a second alternate participant from a group to which the participant's group reports.

15. The conferencing system of claim 14, wherein the participant scoring engine is further configured to select and present a predetermined number of participants to the conference server, which is configured to transmit the predetermined number of participants to the conference host device.

16. The conferencing system of claim 14, wherein the score of each participant is based at least in part on prior participant conference participation.

17. The conferencing system of claim 14, wherein each of the plurality of participant devices is associated with a unique one of the participants and is configured to enter ratings of other of the participants into the conference server, which causes the ratings to be stored in the database, wherein the attributes include the ratings.

18. The conferencing system of claim 14 that is further configured to continuously update the participant attributes in the database.

19. The conferencing system of claim 14, wherein the information further includes an initial participant list and the participant scoring system is further configured to determine the score of the participants based on a relationship between any of the participants in the initial participant list and the participants in the database.

* * * * *